United States Patent
Takeda

[11] 3,711,179
[45] Jan. 16, 1973

[54] ROTARY REARVIEW MIRROR FOR VEHICLES

[76] Inventor: Kin-Ichi Takeda, c/o Takeda Kinzoku Sangyo Co., Ltd. 8, 10, 2-chome, Yanagibashi, Taito-ku, Tokyo, Japan

[22] Filed: Sept. 2, 1970

[21] Appl. No.: 68,906

[52] U.S. Cl. ............... 350/62, 350/63, 350/289, 52/171
[51] Int. Cl. ............................................. G02b 5/08
[58] Field of Search ..... 350/288, 289, 62, 63; 52/171

[56] References Cited

UNITED STATES PATENTS

| | | | |
|---|---|---|---|
| 2,737,852 | 3/1956 | Porter et al | 350/62 |
| 2,948,912 | 8/1960 | Wisdom | 350/62 X |
| 2,298,063 | 10/1942 | MacPherson | 350/62 |
| 3,045,551 | 7/1962 | Bonanno | 350/289 X |
| 1,195,256 | 8/1916 | Nonnenbruch | 350/62 |

FOREIGN PATENTS OR APPLICATIONS

| | | | |
|---|---|---|---|
| 1,392,428 | 5/1964 | France | 350/289 |

Primary Examiner—David Schonberg
Assistant Examiner—Michael J. Tokar
Attorney—Polachek, Saulsbury & Hough

[57] ABSTRACT

A rotary rearview mirror device for a vehicle, characterized by the provision of a motor-driver rotary mirror capable of scattering the raindrops or snowflakes away from the mirror surface by the centrifugal force produced when rotated, whereby the driver of the device-equipped vehicle can exactly realize the circumstances behind his vehicle, thus making it possible to ensure safety drive in the rain or snow.

1 Claim, 4 Drawing Figures

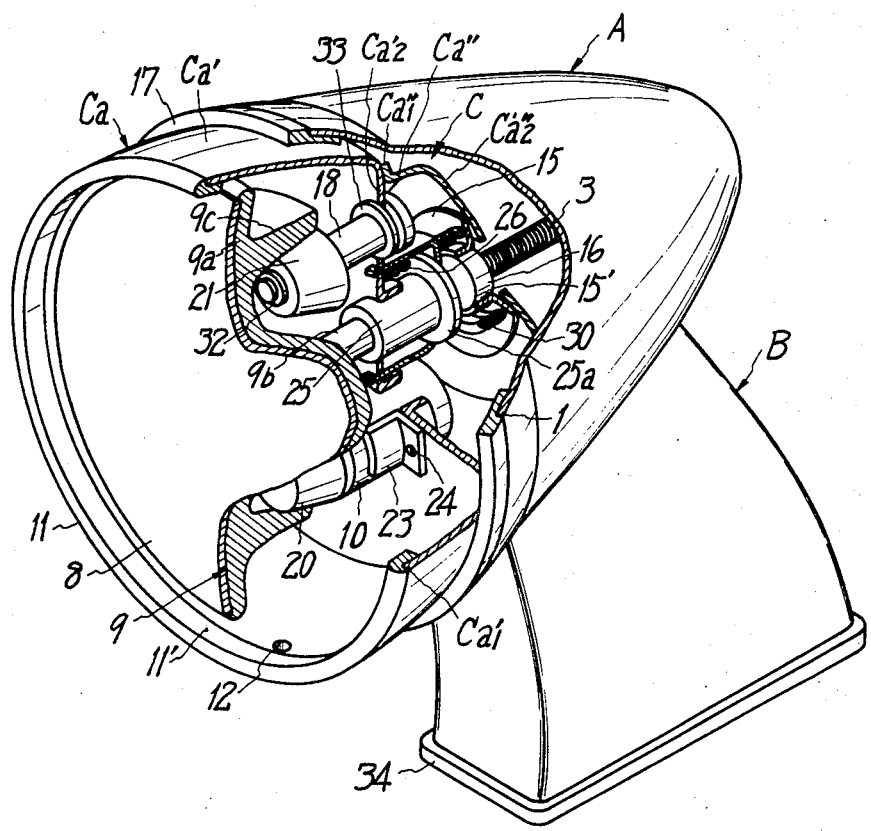

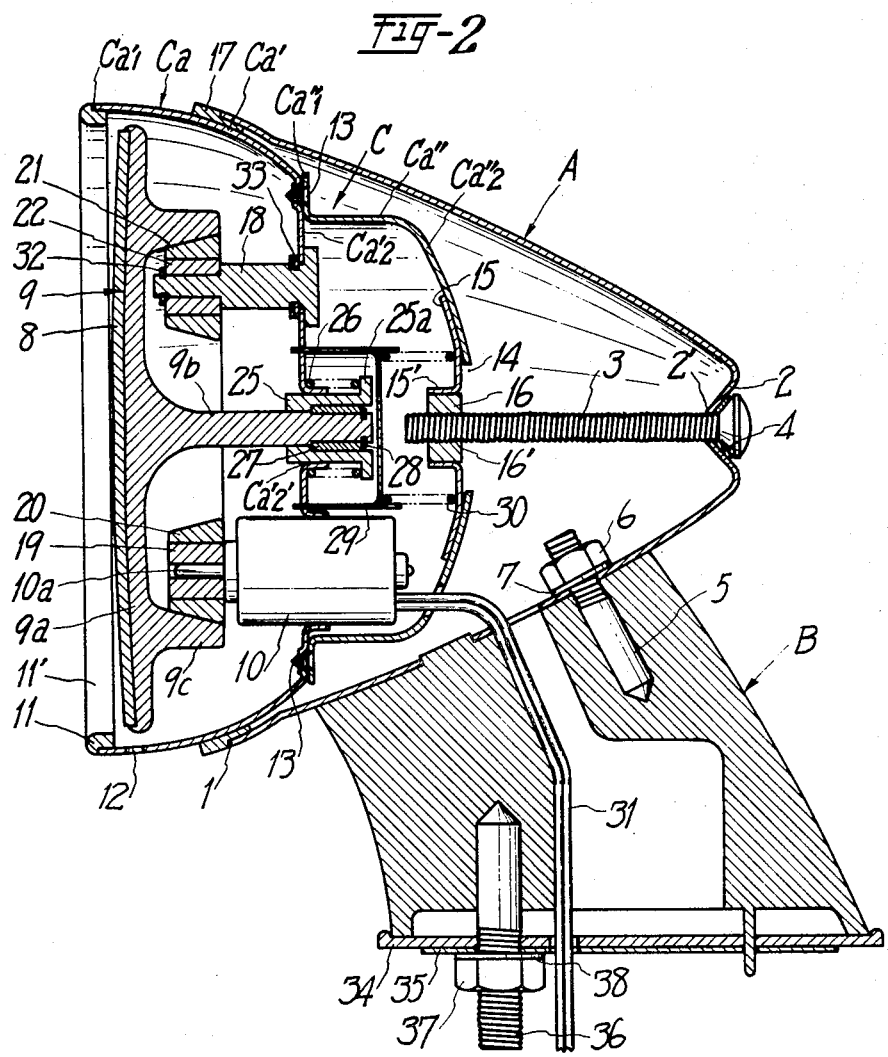

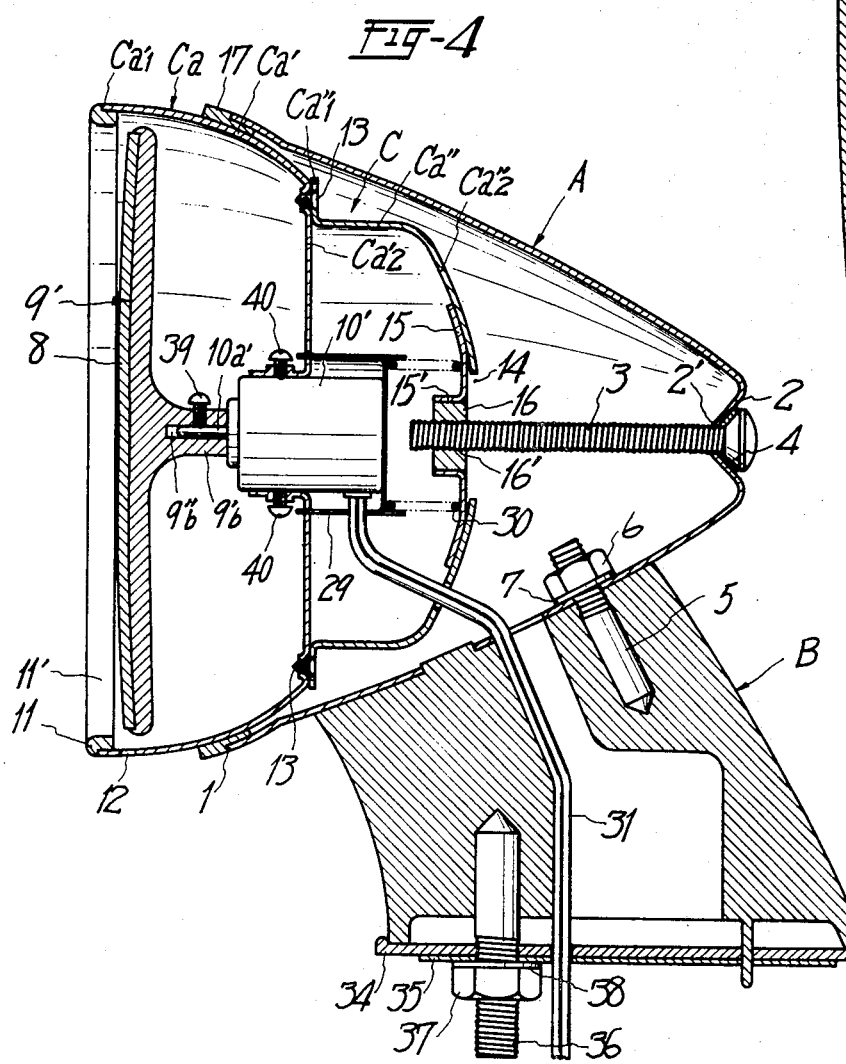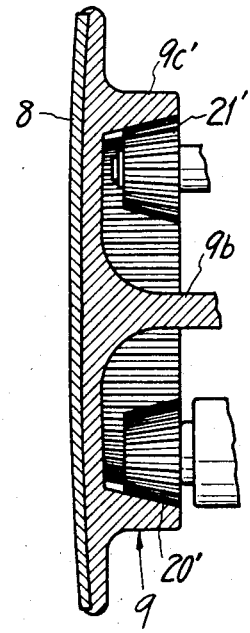

ROTARY REARVIEW MIRROR FOR VEHICLES

SUMMARY OF THE INVENTION

This invention relates to a rearview mirror, and more particularly to a novel rearview mirror device for vehicles in which a rotatable mirror is provided.

Most conventional rearview mirrors for vehicles which have heretofore been proposed are fixedly mounted on their supports and are not rotatable. Therefore, when the vehicles equipped with such stationary mirrors are driven in the rain or snow, the surfaces of the mirrors are covered or coated with the raindrops or snowflakes and are dimmed by them. As a consequence, the function of the rearview mirror is greatly impaired in the rain or snow. For example, when the vehicle equipped with such a conventional rearview mirror is driven at rainy night, the mirror surface will be covered with the raindrops and will diffusely reflect incident rays of light coming from the headlights of the vehicle or vehicles following behind the advance vehicle.

Thus, in the rain or snow, it is difficult for the driver to have a clear picture of the circumstances behind his vehicle, such as the conditions of travel or driving of the vehicle or vehicles following behind his vehicle. There is no doubt that his failure of exact observation of the rear circumstances, owing to such an optical barrier or invisibility made by adherence of the raindrops or snowflakes to the surface of the rearview mirror, will bring about a cause for a serious traffic accident, such as the collision of his vehicle with the vehicle following behind it.

The present invention aims to prevent traffic accidents from occurring, which are caused by the impairment of reflexes of a rearview mirror due to adherence of the raindrops or snowflakes to the surface thereof, by eliminating the above-mentioned drawback of the conventional rearview mirrors, and to this end, provides a new and useful rearview mirror device for vehicles which comprises a motor-driven rotary mirror capable of scattering the raindrops or snowflakes away from the mirror surface by the centrifugal force produced when the mirror is rotated, whereby the driver of the vehicle equipped with the rearview mirror device of the present invention can exactly realize the circumstances or conditions behind his vehicle.

Other objects and advantages of the invention will be apparent from the following detailed description and from the accompanying drawings in which:

FIG. 1 is a partly broken away perspective view of a rearview mirror device as one embodiment of the present invention;

FIG. 2 is a side sectional view of the rearview mirror device shown in FIG. 1;

FIG. 3 is a fragmentary side sectional view of a portion of another embodiment of the present invention; and FIG. 4 is a side sectional view of another embodiment of the present invention.

In FIGS. 1 to 4, like portions or parts are designated with like numerals.

Referring to the drawings in FIGS. 1 and 2, there is shown a rotary rearview mirror device as one embodiment of the present invention. As shown, the device is provided with a generally conically shaped housing A with its front end opened at 1. The rear end of the housing A is recessed to form a seat 2 which receives the head of a screw 3 inserted deep into the housing. This housing A is arranged to be detachably secured, with a stud bolt 5, a nut 6, a washer 7, etc., to a stay B which is adapted to be fixed to an appropriate portion, such as a fender, of a vehicle, such as a car or a truck.

Reference character C designates a mechanism assembly comprising a rotatable mirror 8, a rotator 9 carrying the mirror on its front face, an electric motor 10 to drive the rotator for rotation, and other components which will be described later. The assembly C is designed to be inserted into the housing A through the front opening 1 thereof and to be easily secured in position with the single set screw 3 which serves an adjusting screw for adjusting the angular position of the assembly relative to the housing A.

As shown, the assembly C has a generally bowl-shaped or semi-oval housing $Ca$ which is composed of a front shell $Ca'$ and a rear shell $Ca''$, both of which are of a substantially bowl-like shape, but the former is larger than the latter in dimensions. The front shell $Ca'$ has at its front edge $Ca'1$ a ring member 11 which defines the front opening 11' of the shell, and is formed with a drain hole 12 in its lower portion adjacent to the ring 11.

The rear shell $Ca''$ has at its front end an annular flange $Ca''1$, and is fixed, at the flange, to the peripheral portion of set screw 13. Also, it has a circular opening 14 in the central portion of the rear wall $Ca''2$ thereof which protrudes slightly in the rearward direction. An annular plate 15 for adjusting the angular position of the assembly C is pressed against the inner surface of the rear wall $Ca''2$ around the central opening 14. The screw 3 inserted into the housing A through the aperture 2' formed in the seat 2 via a washer 4 is screwed into an internally threaded hole 16' of a boss 16 which is snugly mounted in a cylindrical portion 15' formed at the central portion of the annular plate 15. As the screw 3 is fastened tightly with the boss 16, the middle portion of the outer periphery of the front shell $Ca'$ which is integrally coupled with the rear shell $Ca''$ is brought into pressure contact with a buffer ring 17 which is fixed to the front end of the housing A, the assembly C as a whole is fixedly secured to the housing A.

Within the front shell $Ca'$ is pivotally supported the rotator 9 having the mirror 8, and is also provided a driving mechanism for driving the rotator 9 for rotation. More specifically, the motor 10 and a pivot 18 are fixed to the rear wall $Ca'2$ of the front shell $Ca'$ in the positions diametrically opposite to each other. The output shaft 10a of the motor 10 fixedly supports thereon a beveled friction wheel 20 of an elastic material, such as a synthetic rubber, through the medium of a boss 19 fixedly mounted on the shaft. A similar beveled friction wheel 21 is rotatably mounted on the pivot 18 through the intermediary of a bearing 22. In the illustrated embodiment, the motor 10 is fixedly secured to the rear wall $Ca'2$ by means of L-shaped fittings 23 and screw 24.

The rotator 9 has a generally T-shaped cross-section, and comprises a disk 9a which securely supports the reflector 8 on its front face, a shaft 9b which is integrally formed with the disk and extends rearwardly from the center thereof, and a shallow, cylindrical friction wheel 9c, which protrudes rearwardly concentrically with the shaft 9b, with its inner face tapered to increase the inside diameter thereof rearwardly. The inner face of the annular wall 9c is tapered at such an angle of inclination as to receive the pair of beveled friction wheels 20, 21 in frictional contact relationship. To reduce the load on the motor 10, the rotator 9 is preferably made of a light metal which is relatively light in weight, such as an alminum alloy.

The shaft 9b of the rotator 9 is rotatably supported on a bearing 25, which is mounted in a circular opening Ca'2'<' formed in the central portion of the rear wall Ca'2 of the front shell Ca'. Under the action of a coil spring 26 which is interposed between an outward flange 25a formed on the bearing 25 and the rear wall Ca'2 and which exerts upon the bearing 25, the shaft 9b is constantly biased rearwardly with the bearing 25 abutting against the collar 27 interposed between the bearing 25 and the shaft 9b and secured in position by a snap ring 28, whereby the inner face of the annular wall 9c of the friction ring 9c of the rotator 9 is kept in pressure contact with both of the pair of friction wheels 20 and 21. This arrangement not merely enhances the frictional force produced between the two, but also avoids any objectionable vibration of the rotator 9 during rotation thereof.

To the middle portion of the rear wall Ca'2 of the front shell Ca' is fixed a cylindrical casing 29, which covers the bearing 25 from behind. Between this casing 29 and the annular plate 15 is interposed a coil spring 30, by the action of which the latter is kept pressed against the inner face of the rear wall of the rear shell Ca''. With the construction above described, the angle of fixation of the assembly C to the housing A can be adjusted by fitting the assembly C into the front opening of the housing A at a desired angle with respect to the latter, sliding the adjusting plate 15, if necessary, and then suitably fastening the plate 15 in position with the screw 3. In this connection, it is to be noted that in combination with this or as a substitute therefor, any suitable angle-adjusting means such, for example, as a stay, which is so constructed as to be bendable at its intermediate portion, may be used.

In FIGS. 1 and 2, reference numeral 31 indicates a power cord for electrically connecting the electric motor 10 to the battery, not shown, of the vehicle. Numerals 32 and 33 indicate snap rings, respectively. Numerals 34 and 35 designate seat members for the stay B. Also, indicated by numerals 36, 37 and 38 are a stud bolt, a nut and a spring washer, respectively.

The rotary rearview mirror device, as described, according to the present invention, is secured usually to a fender, not shown, of a vehicle by means of the stud bolt 36 which protrudes from the underside of the stay B, the nut (37), etc.. At the same time, the power cord 31 of the electric motor 10 is connected to the battery of the vehicle via an electric switch, not shown. The switch may be associated with a timer, for the sake of convenience in handling, as is the case with the so-called washer motor.

In operation, when the switch is turned on, the motor 10 starts rotating and its turning effort is transmitted, through the friction wheel 20 secured to the output shaft 10a of the motor 10, to the rotator 9 in pressure contact with the friction wheel. As a result, the rotator 9 is driven for rotation together with the mirror 8. In the illustrated embodiment shown in FIGS. 1 and 2, as the friction wheels 20 and 21 in pressure contact with the friction ring 9c of the rotator 9 are both made of a rubber material, they do not make a noise, when rotated, and, moreover, transmission of the power is effectively attained.

It should be noted that it is possible, as shown in FIG. 3, to replace the friction ring 9c by a ring gear 9c' while, at the same time, replacing the beveled friction wheels 20 and 21 by bevel gears 20' and 21', which are meshed with the ring gear 9c'. The bevel gears 20' and 21' are preferably made of a plastics material.

Referring now to FIG. 4, there is shown another embodiment of the present invention in which a rotator 9' is directly coupled to a motor 10' which is fixedly mounted on the central portion of the rear wall Ca'2 of the front shell Ca' by means of screws 40.

As clearly shown, the rotator 9' is fixedly mounted on the output shaft 10a' of the motor 10' at its shaft 9'b having an axial bore 9''b by means of a set screw 39.

The fundamental difference between the first embodiment shown in FIGS. 1 and 2 and this embodiment resides only in that the former is arranged to rotate the mirror 8 at reduced speed, while the latter to rotate the mirror 8 without speed reduction. Accordingly, to avoid repetition, further description on this embodiment will be omitted.

Thus, with the device, as described, according to the present invention, the mirror surface is perfectly prevented from being dimmed with the raindrops or snowflakes during the driving of vehicle in the rain or snow, thus making it possible to prevent traffic accidents, due to an imperfect reflection of the circumstances behind the vehicle that is reflected by the mirror, from occurring. Further, when the mirror surface is to be washed in a fine day, it is only necessary to rotate the mirror while spraying water suitably over the mirror. Furthermore, it should be noted that the present invention is applicable as well to protective glasses of headlights, stop lamps, or the like of vehicles.

What I claim is:

1. A rear view mirror device for a vehicle comprising: a rearward hollow outer-housing having a first forward open end; a forward cupped movable housing having a second forward open end and adjustably-slidably rearwardly seated partially through said first opening within said outer housing; lever means for adjustably changing the angle of inclination of said seated movable housing within and relative to said outer housing; an electric motor fixedly mounted to said movable housing within said outer housing, a bevel gear mounted on a shaft driven by said electric motor; a rotator mounted within said movable housing having a ring gear on one side meshed with said bevel gear; and a mirror secured to and rotatable with said rotator; whereby said mirror can be driven for rotation by said electric motor to produce centrifugal force, thereby causing the raindrops or snowflakes adhering to the surface of said mirror to be scattered away therefrom.

* * * * *